US012768445B2

(12) United States Patent
Avril et al.

(10) Patent No.: US 12,768,445 B2
(45) Date of Patent: Oct. 20, 2026

(54) SEALING ELEMENT

(71) Applicant: Carl Freudenberg KG, Weinheim (DE)

(72) Inventors: Thomas Avril, Saint-Victunien (FR); Hervé Di Meo, Saint-Cyr (FR)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 19/221,649

(22) Filed: May 29, 2025

(65) Prior Publication Data

US 2025/0369515 A1 Dec. 4, 2025

(30) Foreign Application Priority Data

Jun. 3, 2024 (EP) .................................... 24179701

(51) Int. Cl.
*F16J 15/02* (2006.01)
*F16J 15/06* (2006.01)

(52) U.S. Cl.
CPC ........... *F16J 15/025* (2013.01); *F16J 15/061* (2013.01)

(58) Field of Classification Search
CPC ........ F16J 15/022; F16J 15/024; F16J 15/025; F16J 15/061
See application file for complete search history.

(56) References Cited

U.S. PATENT DOCUMENTS 3,472,523 A * 10/1969 Carlson, Jr. ............ F16J 15/106 277/649
3,584,889 A * 6/1971 Sheets ................... F16L 21/022 277/625
3,854,737 A * 12/1974 Gilliam, Sr. ......... F16J 15/3236 277/566
5,326,138 A * 7/1994 Claes .................... F16L 37/084 285/903
5,415,436 A * 5/1995 Claes .................. F16L 25/0054 285/903
5,513,674 A * 5/1996 Frisch ...................... F16J 15/56 251/324
5,934,323 A * 8/1999 Akimoto ............. F16K 11/0712 251/324

(Continued)

FOREIGN PATENT DOCUMENTS

DE 102008032572 A1 2/2010
KR 101384681 B1 4/2014

*Primary Examiner* — Nicholas L Foster
(74) *Attorney, Agent, or Firm* — LEYDIG, VOIT & MAYER, LTD.

(57) ABSTRACT

A sealing element for introduction into a cutout with a lubricant or without a lubricant, where the sealing element has a longitudinal extent direction. A sealing cross section of the sealing element is arranged substantially orthogonal to the longitudinal extent direction, where the sealing cross section includes a stabilizing surface. The stabilizing surface is configured to retain the sealing element in the cutout and/or to secure the sealing element in the cutout against tilting, where the sealing cross section further includes a retaining surface. The retaining surface including at least one securing element which projects from the stabilizing surface, where the retaining surface is configured to secure the sealing element against sliding out of the cutout by the securing element.

7 Claims, 2 Drawing Sheets

(56) References Cited

U.S. PATENT DOCUMENTS

| | | | | |
|---|---|---|---|---|
| 6,065,757 | A * | 5/2000 | Schneider | F16J 15/024 277/642 |
| 6,264,206 | B1 * | 7/2001 | Hashizawa | F16J 15/062 277/648 |
| 6,343,623 | B2 * | 2/2002 | Hegler | F16L 25/0036 285/903 |
| 6,802,513 | B2 * | 10/2004 | Ranzau | F16J 15/025 277/648 |
| 7,007,954 | B2 * | 3/2006 | Travers | F16J 15/025 277/626 |
| 8,628,095 | B2 * | 1/2014 | Danielewicz | F16J 15/106 277/630 |
| 8,783,694 | B2 * | 7/2014 | Matsuo | F16J 15/025 277/642 |
| 9,851,009 | B2 * | 12/2017 | Yu | F16J 15/104 |
| 10,731,760 | B2 * | 8/2020 | Ishigami | F16J 15/0893 |
| 11,732,801 | B2 * | 8/2023 | Whitehead | F16J 15/104 277/590 |
| 12,209,663 | B2 * | 1/2025 | Yang | F16J 15/062 |
| 2001/0027818 | A1 * | 10/2001 | Hegler | F16L 25/0036 138/121 |
| 2008/0265523 | A1 * | 10/2008 | Galpin | F16J 15/061 277/590 |
| 2010/0084827 | A1 * | 4/2010 | Peddle | F16J 15/061 277/644 |
| 2010/0264606 | A1 * | 10/2010 | Hayashi | H04M 1/18 277/641 |
| 2014/0217680 | A1 * | 8/2014 | Mori | F16J 15/061 277/594 |
| 2015/0316152 | A1 | 11/2015 | Fietz et al. | |
| 2017/0138480 | A1 * | 5/2017 | Yu | F16J 15/061 |
| 2018/0080564 | A1 * | 3/2018 | Tanner | F16J 15/027 |
| 2018/0251971 | A1 | 9/2018 | Tuynman et al. | |
| 2019/0178384 | A1 * | 6/2019 | Voehringer | F16J 15/3236 |
| 2024/0026975 | A1 | 1/2024 | Yang et al. | |

* cited by examiner

SEALING ELEMENT

CROSS REFERENCE TO RELATED APPLICATIONS

This application claims benefit to European Patent Application No. EP 24 179 701.8, filed on Jun. 3, 2024, which is hereby incorporated by reference herein.

FIELD

The present disclosure includes a sealing element for introduction into a cutout, such as a groove, to a tool and to a vehicle or a plant.

BACKGROUND

There are currently a variety of different solutions for the design of sealing elements. As a result of the increasing number of applications for sealing elements owing to increased requirements in terms of quality and performance, the need for innovative and robust sealing elements is continuously increasing.

The constant increase in efficiency in plant and automotive engineering for reducing consumption and the increasing competition in these fields results in cost pressure, and therefore, inexpensive plant components that are more efficient and more sustainable are in greater demand.

SUMMARY

In an embodiment, the present disclosure provides a sealing element for introduction into a cutout with a lubricant or without a lubricant, where the sealing element has a longitudinal extent direction. A sealing cross section of the sealing element is arranged substantially orthogonal to the longitudinal extent direction, where the sealing cross section includes a stabilizing surface. The stabilizing surface is configured to retain the sealing element in the cutout and/or to secure the sealing element in the cutout against tilting, where the sealing cross section further includes a retaining surface. The retaining surface includes at least one securing element which projects from the stabilizing surface, where the retaining surface is configured to secure the sealing element against sliding out of the cutout by the securing element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
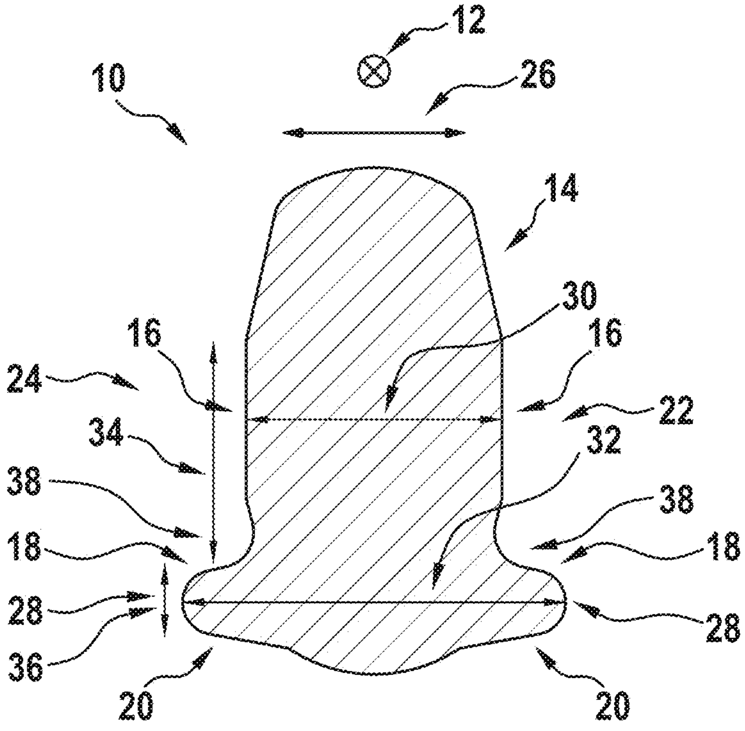
FIGS. 1 to 3 show a sealing element according to an embodiment of the present disclosure.

An improved sealing element can advantageously be provided with embodiments of the present disclosure.

An advantage of the sealing element of the present disclosure is that, with the aid of the securing element on the retaining surface, the sealing element can be easily mounted in a cutout, in particular a groove, and the sealing element in this cutout is securely retained in the cutout with or without lubricant. Another advantage is that, with the aid of the securing element on the retaining surface, the sealing element can be retained in the cutout, in particular independently of an orientation and/or installation position of the cutout or of the housing. Another advantage is that, by the securing element being on the retaining surface, a higher resistance to sliding out of the cutout can be formed, in order to thus be able to further increase the reliability of the sealing element.

The present disclosure provides the sealing element for introduction into a cutout, in particular a groove, with a lubricant or without a lubricant, has a longitudinal extent direction, wherein a sealing cross section of the sealing element is arranged substantially orthogonal to the longitudinal extent direction, wherein the sealing cross section has a stabilizing surface, wherein the stabilizing surface is configured to retain the sealing element in the cutout and/or to secure the sealing element in the cutout against tilting, wherein the sealing cross section has a retaining surface, wherein the retaining surface has at least one securing element which projects from the stabilizing surface, wherein the retaining surface is configured to secure the sealing element against sliding out of the cutout.

In other words, adhesion of the sealing element in a cutout can be improved by having the securing element on the retaining surface, said securing element projecting beyond the stabilizing surface. At the same time, good mountability of the sealing element in the cutout can be achieved. In this context, “substantially orthogonal” means in a deviation of ±15°. The stabilizing surface can be used to position, to orient and/or to fix in terms of its position a sealing lip or similar of the sealing element. Preferably, the retaining surface can be used to retain the sealing element in the cutout by the securing element. Further preferably, the stabilizing surface can be configured to prevent the sealing element from sliding out of the cutout or to assist an effect of the securing element.

In an embodiment of the present disclosure, the sealing element has a first side surface and a second side surface, which each have the retaining surface with the securing element.

An advantage of this embodiment is that arranging the retaining element with the securing element on both sides can further increase the effect for avoiding sliding-out.

In an embodiment of the present disclosure, the sealing element has a transverse extent direction, wherein a tip of the securing element is spaced apart from the stabilizing surface in the transverse extent direction.

The advantage of this embodiment is that the tip of the securing element or a transverse extent length of the securing element can be adapted to individual cutouts, in order to be able to keep a width at the securing surface substantially constant.

In an embodiment of the present disclosure, a first ratio between a first width of the sealing element at the stabilizing surface and a second width at the retaining surface lies between 0.7 and 0.9.

An advantage of this embodiment is that, in this ratio range of the width, the sealing element has sufficient inherent stability, such that a sealing lip remains substantially orthogonal to the transverse extent direction of the sealing element.

In an embodiment of the present disclosure, a second ratio between a first length of the stabilizing surface and a second length of the retaining surface lies between 2.5 and 3.

An advantage of this embodiment is that, in this ratio range, it was surprisingly determined that the sealing element develops a vibration-damping effect.

In an embodiment of the present disclosure, the retaining surface is arranged closer to a bottom of the cutout than the stabilizing surface when the sealing element is arranged in the cutout.

An advantage of this embodiment is that the orienting effect of the stabilizing surface for the sealing lip or the sealing element is influenced to a lesser extent by the retaining surface with the securing element when the retaining surface is closer to the bottom of the cutout.

In an embodiment of the present disclosure, the sealing element has, between the stabilizing surface and the retaining surface, an undercut element which is configured to at least partially deflect the securing element in order to simplify insertion of the sealing element into the cutout.

An advantage of this embodiment is that the undercut element can omit a little material at the sealing element, in order to thus simplify tilting of the securing element in relation to the sealing element, with the result that insertion of the sealing element is improved.

In an embodiment of the present disclosure, the securing element extends over a total extent length of the sealing element in the longitudinal extent direction.

An advantage of this embodiment is that the producibility of the sealing element is facilitated, in particular by enabling, for example, an extrusion operation.

An embodiment of the present disclosure includes a tool for the primary forming and/or extrusion of a sealing element, as described above and below, wherein the tool is configured to substantially simultaneously form a stabilizing surface and a retaining surface, wherein the retaining surface has a securing element which projects from the stabilizing surface.

For example, the tool may be used in an extrusion operation and/or a primary forming operation including plastic, rubber and/or elastomer. For example, the sealing element may be produced by a plastics injection moulding method. In an embodiment, the sealing element may also be continuously extruded and cut to a predetermined length.

An embodiment of the present disclosure includes a vehicle and/or a plant which has at least one sealing element, as described above and below.

It should also be pointed out that the term "unit" should be understood broadly in the present case and encompasses both a one-part design and a multi-part design of the respective unit, wherein the respective subunits do not have to be provided at a position in the plant, but may also be provided for parts of a plant.

All the disclosures described above and below with respect to one aspect of the disclosure apply equally to all further aspects of the disclosure.

EMBODIMENTS OF THE INVENTION

The figures are merely schematic and not true to scale. In the figures, elements that are identical, have the same function and/or are similar can be denoted by the same reference designations.

FIG. 1 shows a sealing element 10 according to an embodiment of the present disclosure. The sealing element 10 for introduction into a cutout has a longitudinal extent direction 12, wherein a sealing cross section 14 of the sealing element 10 is arranged substantially orthogonal to the longitudinal extent direction 12, wherein the sealing cross section 14 has a stabilizing surface 16, wherein the stabilizing surface 16 is configured to secure the sealing element 10 in the cutout against tilting, wherein the sealing cross section 14 has a retaining surface 18, wherein the retaining surface 18 has at least one securing element 20 which projects from the stabilizing surface 16, wherein the retaining surface 18 is configured to secure the sealing element 10 against sliding out of the cutout by the securing element 20.

As depicted in FIG. 1, the sealing element 10 has a first side surface 22 with a retaining surface 18 and a securing element 20. In an embodiment, the sealing element 10 also has a second side surface 24 with a retaining surface 18 and a securing element 20. In an embodiment of the present disclosure, the sealing element 10 has a transverse extent direction 26 which is oriented in particular orthogonal to the longitudinal extent direction 12. In an embodiment, a tip 28 of the securing element 20 is spaced apart from the stabilizing surface 16 in the transverse extent direction 26 or the securing element 20 projects away from the stabilizing surface 16, as depicted in FIG. 1.

In an embodiment of the present disclosure, a first ratio between a first width 30, which is defined at the height of the stabilizing surface 16, and a second width 32, which is defined at the height of the retaining surface 18, is between 0.7 and 0.9. In an embodiment of the present disclosure, FIG. 1 shows a second ratio between the first length 34 of the stabilizing surface 16 and a second length 36 of the retaining surface 18, said ratio lying in particular between 2.5 and 3.

In an embodiment, an undercut element 38 is arranged between the stabilizing surface 16 and the retaining surface 18. The undercut element 38 can be used to improve a deflection of the securing element 20 of the retaining surface 18.

Figure 2:
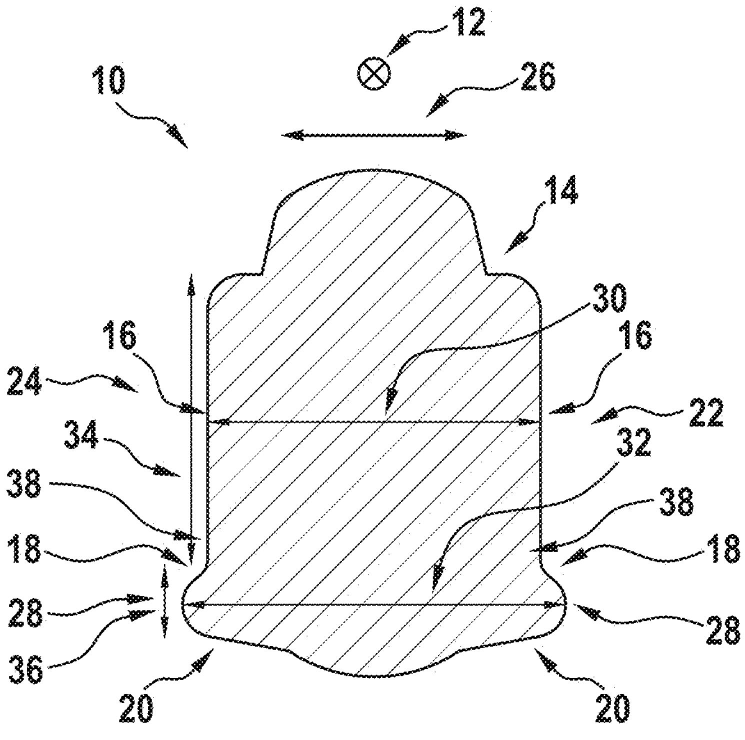

FIG. 2 shows a sealing element 10 according to an embodiment of the present disclosure. In an embodiment of the present disclosure, the sealing element 10 has a first width 30 at the stabilizing surface 16 and a second width 32 at the retaining surface 18 with the securing element 20. In an embodiment, there is a first ratio between the first width 30 and the second width 32 of between 0.7 and 0.9. In embodiments, the stabilizing surface 16 has a first length 34 and the retaining surface 18 has a second length 36. In an embodiment of the present disclosure, a ratio between the first length 34 and the second length 36 is between 2.5 and 3. In an embodiment, the securing element 20 may have rounded corners or similar, in order to thus simplify a mounting operation of the sealing element 10. As illustrated in FIG. 2, the sealing element 10 has a first side surface 22 and a second side surface 24, in each of which the retaining surface 18 and the securing element 20 are arranged.

Figure 3:
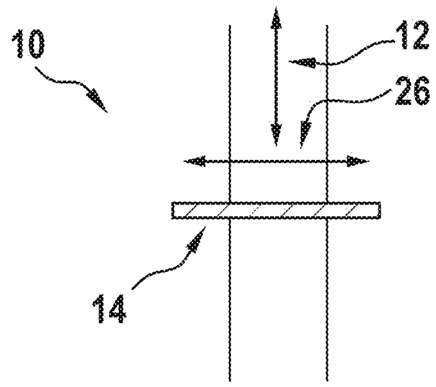

FIG. 3 shows a sealing element 10 according to an embodiment of the present disclosure. The sealing element 10 is illustrated in a plan view in FIG. 3, such that the longitudinal extent direction 12 of the sealing element can be seen. The transverse extent direction 26 is arranged substantially orthogonal to the longitudinal extent direction 12. In an embodiment of the present disclosure, the sealing cross section 14 may be arranged substantially orthogonal to the longitudinal extent direction 12.

Figure 4:
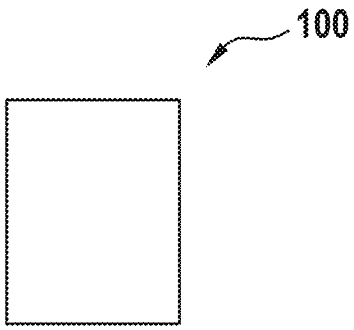
FIG. 4 shows a tool according to an embodiment of the present disclosure.

FIG. 4 shows a tool 100 according to an embodiment of the present disclosure. The tool 100 for the primary forming or extrusion of a sealing element, as described above and below, is configured to substantially simultaneously form a stabilizing surface 16 and a retaining surface 18, wherein the retaining surface 18 has a securing element 20 which projects from the stabilizing surface 16.

Figure 5:
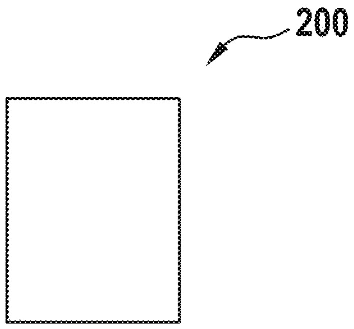
FIG. 5 shows a vehicle according to an embodiment of the present disclosure.

FIG. 5 shows a vehicle 200 according to an embodiment of the present disclosure. The vehicle 200 preferably has a sealing element 10, as described above and below.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A. B and C.

LIST OF REFERENCE DESIGNATIONS

10 Sealing element
12 Longitudinal extent direction
14 Sealing cross section
16 Stabilizing surface
18 Retaining surface
20 Securing element
22 First side surface
24 Second side surface
26 Transverse extent direction
28 Tip
30 First width
32 Second width
34 First length
36 Second length
38 Undercut element
100 Tool
200 Vehicle

The invention claimed is:

1. A sealing element for introduction into a cutout with a lubricant or without a lubricant, wherein the sealing element comprises:
- a longitudinal extent direction;
- a sealing cross section that is arranged substantially orthogonal to the longitudinal extent direction, wherein the sealing cross section comprises:
  - a stabilizing surface configured to retain the sealing element in the cutout and to secure the sealing element in the cutout against tilting;
  - a first side surface including a first retaining surface and a first securing element; and
  - a second side surface including a second retaining surface and a second securing element, wherein the first and second securing elements project from the stabilizing surface, wherein the first and second retaining surfaces are configured to secure the sealing element against sliding out of the cutout by the securing element;
- a transverse extent direction that is oriented orthogonally to the longitudinal extent direction and the stabilizing surface, wherein a tip of the securing element is spaced apart from the stabilizing surface in the transverse extent direction, and wherein the first securing element and the second securing element extend along the longitudinal extent direction and taper towards the tip; and
- an entirely arcuate bottom surface that is adjacent to the first securing element and the second securing element, wherein a first ratio between a first width of the sealing element at the stabilizing surface and a second width at the first and second retaining surfaces is between 0.7 and 0.9.

2. The sealing element according to claim 1, wherein a second ratio between a first length of the stabilizing surface and a second length of the first and second retaining surfaces is between 2.5 and 3.

3. The sealing element according to claim 1, wherein the first and second retaining surfaces are closer to a bottom of the cutout than the stabilizing surface when the sealing element is arranged in the cutout.

4. The sealing element according to claim 1, wherein the sealing element further comprises, between the stabilizing surface and the first and second retaining surfaces, an undercut element which is configured to at least partially deflect the securing element in order to simplify insertion of the sealing element into the cutout.

5. The sealing element according to claim 1, wherein the first and second securing elements extends over a total extent length of the sealing element in the longitudinal extent direction.

6. The sealing element of claim 1 being made by an extrusion process using a tool, wherein the tool is configured to substantially simultaneously form the stabilizing surface and the first and second retaining surfaces, wherein the first retaining surface has the first securing element projecting from the stabilizing surface, and wherein the second retaining surface has the second securing element projecting from the stabilizing surface.

7. The sealing element of claim 1 being configured for use in a vehicle or a plant.

* * * * *